Figure 1:
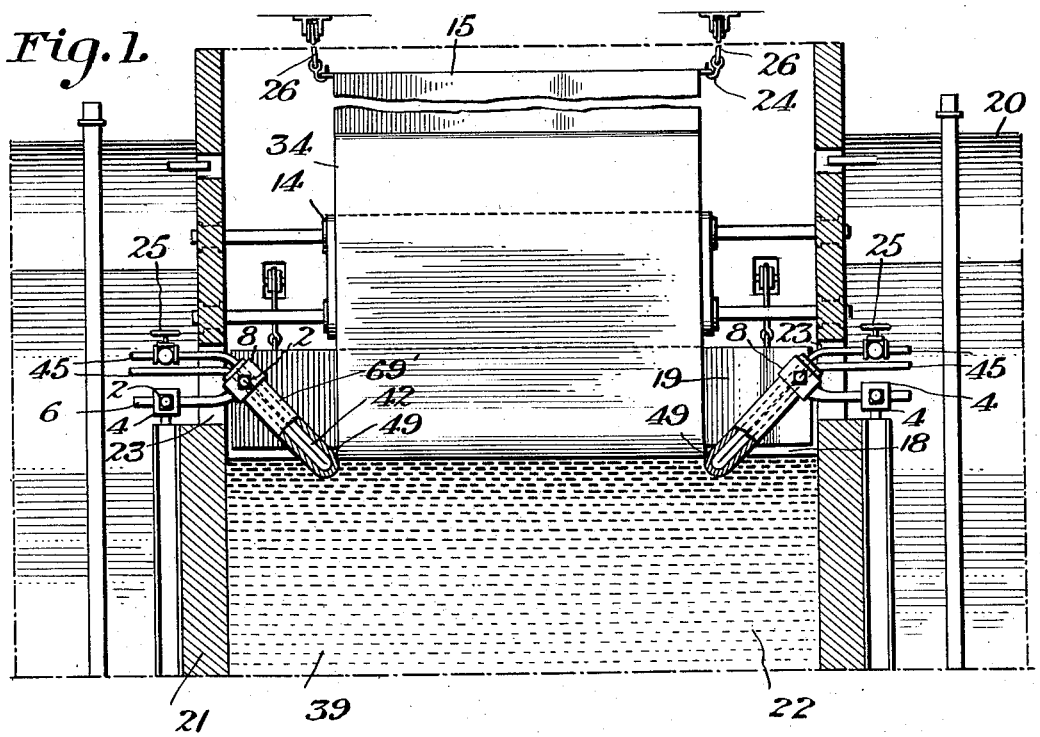

July 30, 1929.  A. E. SPINASSE  1,722,483
APPARATUS FOR DRAWING GLASS
Original Filed Jan. 10, 1918

Inventor
A. E. Spinasse
By Sturtevant & Mason
his Attorneys

Patented July 30, 1929.

1,722,483

UNITED STATES PATENT OFFICE.

ARTHUR E. SPINASSE, OF MOUNT VERNON, OHIO.

APPARATUS FOR DRAWING GLASS.

Original application filed January 10, 1918, Serial No. 211,266. Divided and this application filed May 4, 1922. Serial No. 558,539.

My invention relates to an improved method of and certain apparatus for drawing glass objects, and is more particularly directed to the drawing of glass sheets or plates. The object of my invention is a process adapted to simplify and improve the method of producing sheet glass, to provide adequate means of regulating and effecting production, to reduce the manufacturing cost and to improve the qualities of the product. My invention also involves specially designed means for carrying out my process.

The broad features resorted to in my present invention are to be found in my Patent No. 1,167,534, dated January 11, 1916, and reference for disclosure of the broad features of local regulation, anchorage and segregation involved in this case, may be had to the above named patent.

I provide means for drawing the sheet of glass from an open bath of molten glass and maintain the desired width of the sheet by use of anchoring members. I make the anchoring points small, so small as to, in some cases, extend only the thickness of the sheet or plate drawn, so that during draw, there is comparatively reduced tendency of the sheet to form thick and thin, causing the sheet to form with edges of approximately the same thickness as the sheet body portions, at times. The base of the glass or plate drawn at the source of generation or adjacent the surface of the glass bath, as a rule is always thicker in cross section at right angle to the plane of the plate than that of the finished sheet or plate above, and I prefer to limit, confine or restrict my points of anchorage at the edge producing portions of the glass on a line not substantially greater or preferably less and well within the thickness or opposite planes of the base of the initially drawn sheet or plate. The sheet I form, is thus of substantially even thickness, texture and transparency throughout, and substantially even in width. The form and dimensions of the anchoring points and temperature regulation, control the intensity of the anchorage between said points and the viscid glass forming the sheet edges in adherent contact therewith. It also determines the intensity of the vertical stretching action at such points by the pull of the sheet edges and thus further regulates thickness and form of the sheet edges drawn.

In the accompanying drawing:—

Figure 2:
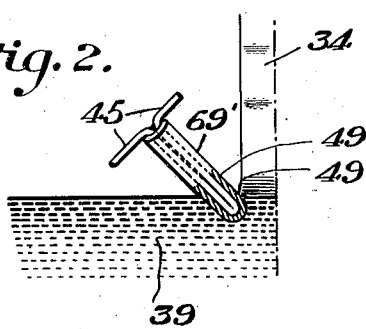

Figure 1 is a transverse vertical section through a glass drawing device, showing the improvements of the invention applied thereto; and Figure 2 is a fragmentary detail view of one of the anchoring members in position.

In Figures 1 and 2, I show a preferred structure for carrying out my method of drawing glass sheets. In Figure 1, 20 is the melting tank furnace, 21 a drawing chamber projecting therefrom and supplied with molten glass 22 from said tank, said chamber being maintained at high temperature by any suitable heating means; and by furnace heat passing through space 18 which may be regulated by lowering damper 19.

As shown in Figure 1, in the walls of the drawing chamber, I provide opening 23 into which I project pipes 45, having controlling valve 25, and directing a temperature-affecting medium such as air, into the end chambers 42 of the segregating member, whereby I am enabled to regulate temperature locally and obtain proper viscid glass anchorage at points 49 where the sheet edges drawn take form. In starting the draw the bait 15, by means of cable 26 is lowered between the rolls 14 until slightly immersed in glass pool 39, and with its extreme portions at points 49; the bait is then raised drawing a glass sheet 34 of uniform width, and with each successive portion of the sheet edges drawn from the adherent viscid glass in contact with the temperature-regulated walls of the segregated member at points 49. When sufficiently elevated the sheet is cut laterally by any well-known means, the bait removed from the hooks 24, and the drawing may become continuous. As described, the sheet edges are drawn from the glass in contact with or near to the walls of the segregating member at points 49.

The pipe 45, and pocket or tube 69', which may be connected in sections, may be provided in any number, preferably one on each side of the sheet and form thereto the points of anchorage 49; they are made adjustable to change the width of the sheet drawn, to take desired position with respect to the surface of the glass, and to take proper position beneath the rolls 32 or 14 hereinbefore described. In Figure 1, as shown, the refractory tube 69' is mounted to rotate and slide into collar 8 which is provided with set screws 2 to hold the tube in position, said collar having an arm 6 which rotates and slides horizontally in fixed bearing or collar 4, having also a set screw 2 to hold the arm fixed, thus permitting adjustment or anchoring points 49 to desired positions.

The part of the tube or of the pipe forming the points of anchorage 49, which may be of suitable form, preferably rounded, is submerged, though not far from the surface as shown, and may be adjusted to take position at or projecting slightly above the surface, this permits varying the area or surface of the points of anchorage offered to the sheet edges which are drawn from the apexes thereof, at the points of formation. It will be seen also that the points are surrounded by clear glass unaffected by walls' proximity.

I prefer to control the temperature of the refractory tube at anchoring point, by circulating air under pressure in pipe 45, the air pressure being controlled by means of valve 25, there being sufficient room left for the escape of the air. Before immersed or brought in contact with the glass the refractory tube is heated or conditioned to insure its adherence to the glass, thereafter the temperature may be changed as required to insure proper glass viscosity and its intensified adherence to the members at points 49. The position, dimension and form, and temperature of the portion of the members forming the points of anchorage, determine the intensity of the anchorage and thickness of the sheet edges formed at such points.

Therefore, in Figure 1 I show a return bent pipe within a refractory tube 69', the end of which being immersed in the glass from above to provide a circulation for temperature affecting fluid such as air or water forced therethrough, said fluid being controlled by means of valve 25. The diameter of the pipes may vary, preferably ⅛ to 1 inch or more, depending upon the thickness and form of the sheet edges desired; they have suitable thickness of walls, may be round or of any form in cross section, and when oblong, the sheet edges are preferably drawn from the narrow edges thereof.

In starting the drawing, the refractory tubes 69' upon the pipes, preferably two in number, are made red hot or conditioned so that they will adhere to the portions of glass with which they contact, they are thus set apart in contact with the mass of glass to form the anchoring points 49, fluid is then caused to circulate in the pipes to regulate the temperature of the refractory tubes and intensify adherence of the glass thereto, to obtain proper anchorage for the sheet edges. The sheet glass being drawn from the glass between said points, and with the edges thereof drawn anchored at such points. Proper shielding as heretofore described being provided for the sheet during drawing.

The efficiency of the anchorage is dependent upon the intensity of the adhesion of the portions of glass which produce the sheet edges at anchoring points. It will be understood that the smaller the anchoring points, the faster the heat carrier must be circulated therein, this is also determined according to the speed of drawing, and to the quantities of glass from the mass fed at such points, and also as to the degree of the glass adherence or stretching to the sheet edges desired at such points. As the molten glass from beneath approach the anchoring points, heat in due proportions is being carried away by the fluid or medium circulated within the members at said points, obtaining proper glass viscosity and adherence thereto.

The thickness of the sheet is also dependent upon the condition of the glass and the speed of the draw, the faster the speed the thinner the sheet; this is also true for the edges, and in order to obtain sheet edges of proper thickness, the speed of draw is regulated with due respect to the proportion of glass fed by the pull or hydrostatic pressure at the anchoring points, depending also on the shape of the anchoring portion of the members, and their respective temperature at the right time for proper viscosity and adherence of the glass at such points as required.

The aim being to provide adherent points of anchorage in a bath of glass for the edges of a continuously drawn sheet, preferably hollow members of hard material, and of proper form and dimension, so that temperature affecting medium may be circulating into their interior, affecting proper temperature by conduction through the walls of the members, precisely to an extent and points required to obtain proper viscosity and adherence of glass thereto, enabling the drawing of a sheet of glass of uniform width and with the edges thereof drawn in proper form and reduced thickness at such points.

By the term "edges" where it appears, I aim to cover the extreme side edges of the drawn sheet but this may include the adjacent marginal portions thereof.

This application is a division and a continuation of my pending application Serial No. 211,266 filed January 10, 1918, now Patent 1,692,585, granted Nov. 20, 1928, to which reference may be made.

Having thus described the invention, what I claim as new, and desire to secure by Letters-Patent, is:—

1. In an apparatus for drawing sheet glass wherein the sheet is drawn upwardly from a bath of molten glass, means for forming and maintaining cooler areas of viscous glass as sources from which the edge portions of the sheet are drawn, comprising a pair of internally water-cooled members projecting downwardly into the molten bath, and sheathings of refractory material for the portions of the members within the molten bath, said water-cooled members and sheathings therefor being disposed substantially in a plane containing the drawn sheet, and of such dimension as to localize the cooling effect upon the molten glass at the edges of the sheet for thinning said edges of the sheet and maintaining the width of the sheet.

2. In an apparatus for drawing sheet glass wherein the sheet is drawn upwardly from a bath of molten glass, means for maintaining cooler areas of viscous glass as sources from which sheet edges are drawn, comprising a pair of hollow interiorly cooled metallic members projecting into the molten bath, and sheathings of refractory material incasing the end portions of the metallic members within the molten glass, said metallic members and sheathings being disposed in a plane containing the drawn sheet and adjacent the sources of the sheet edge portions, and of such dimensions as to localize the cooling effect upon the molten glass at said edge portions for thinning the edges of the sheet and maintaining the width of said sheet.

3. A sheet edge anchoring device comprising an internally cooled pipe narrow in a direction transversely of the base of the sheet, and a hot thin refractory sheathing adapted to adhere to the glass enveloping the pipe and disposed in adherent contact with the sheet edge producing portion of the glass.

4. A sheet edge anchoring device comprising an internally cooled member narrow in a direction transversely of the base of the sheet, and a hot tubular refractory sheathing adapted to adhere to the glass having a closed end fitting the member and disposed in adherent contact with the forming edge portion of the sheet.

5. A sheet edge anchoring device comprising an internally water cooled pipe extending in line at the edge of the sheet, and a thin tubular sheathing adapted to adhere to the glass about the pipe.

6. A sheet edge anchoring device comprising a pipe narrow in a direction transversely of the side edge of the sheet, and a thin sheathing of refractory material adapted to adhere to the glass about the pipe.

7. A sheet edge anchoring device comprising an internally cooled member narrow in a direction transversely of the base of the sheet, and a thin refractory sheathing adapted to adhere to the glass enveloping the member.

8. A sheet edge anchoring device comprising a metallic member narrow in a direction transversely of the base of the sheet and having a thin hot adherent sheathing of clay thereon.

9. In apparatus for drawing sheet glass from a bath of molten glass, means for maintaining the desired width of the sheet comprising a temperature controlled member narrow in a direction transversely of the base of the sheet being drawn, means for maintaining said member in fixed position adjacent the forming edge portion of the sheet, and a hot thin sheathing of refractory material about the member disposed to contact and adhere with the edge producing portion of the glass.

In testimony whereof, I affix my signature:

ARTHUR E. SPINASSE.